Oct. 4, 1966 W. J. BROWN 3,276,557
MACHINE GUARDS

Filed Aug. 31, 1964 4 Sheets-Sheet 1

Inventor
William James Brown
By Stevens Davis Miller & Mosher
Attorneys

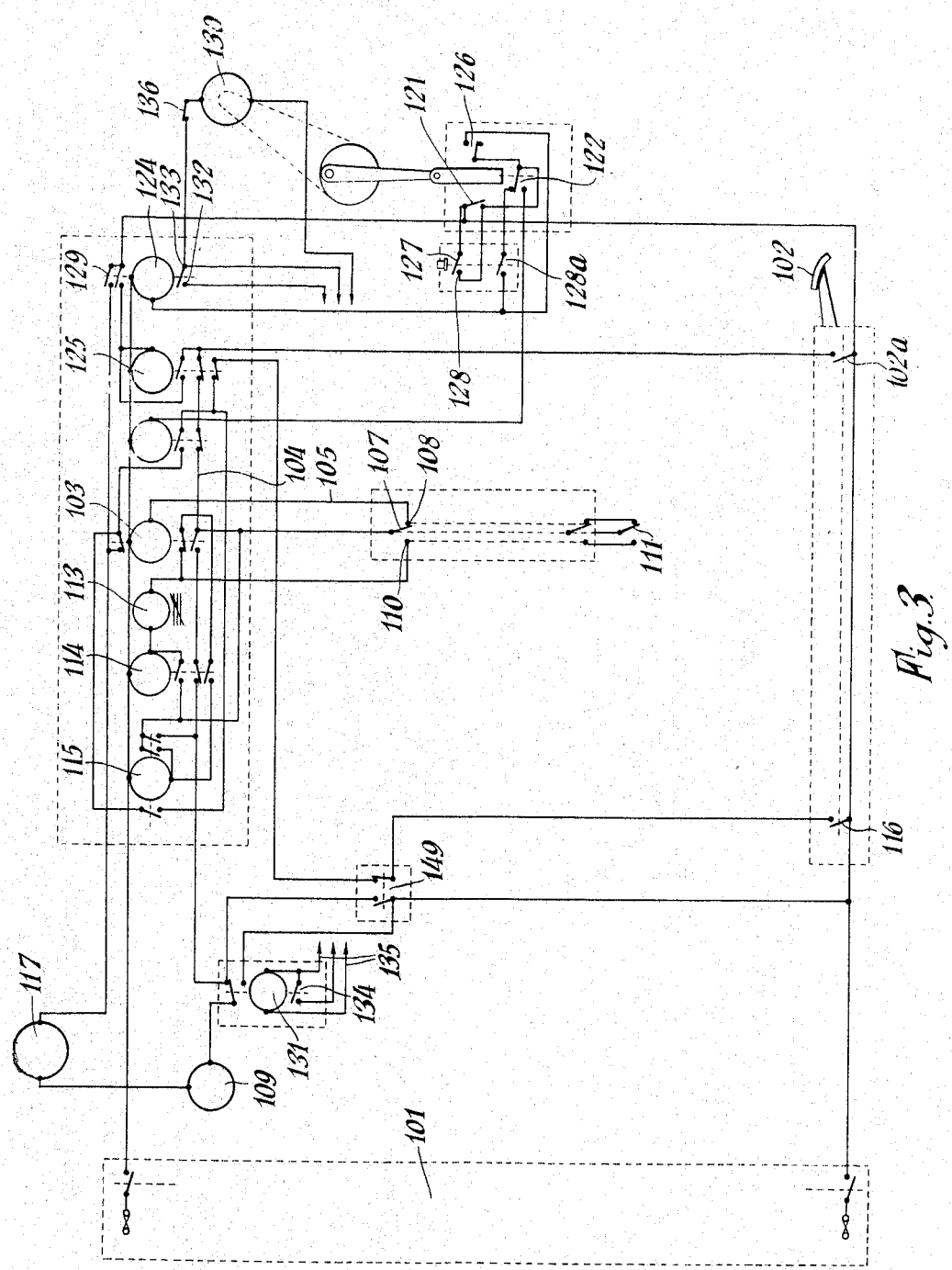

Oct. 4, 1966 W. J. BROWN 3,276,557
MACHINE GUARDS
Filed Aug. 31, 1964 4 Sheets-Sheet 4
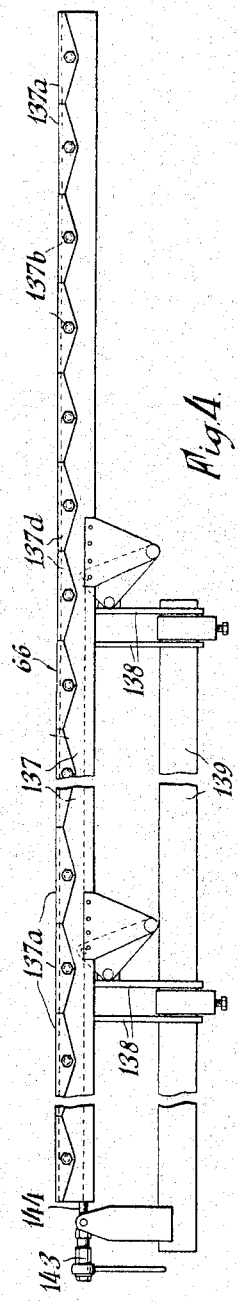
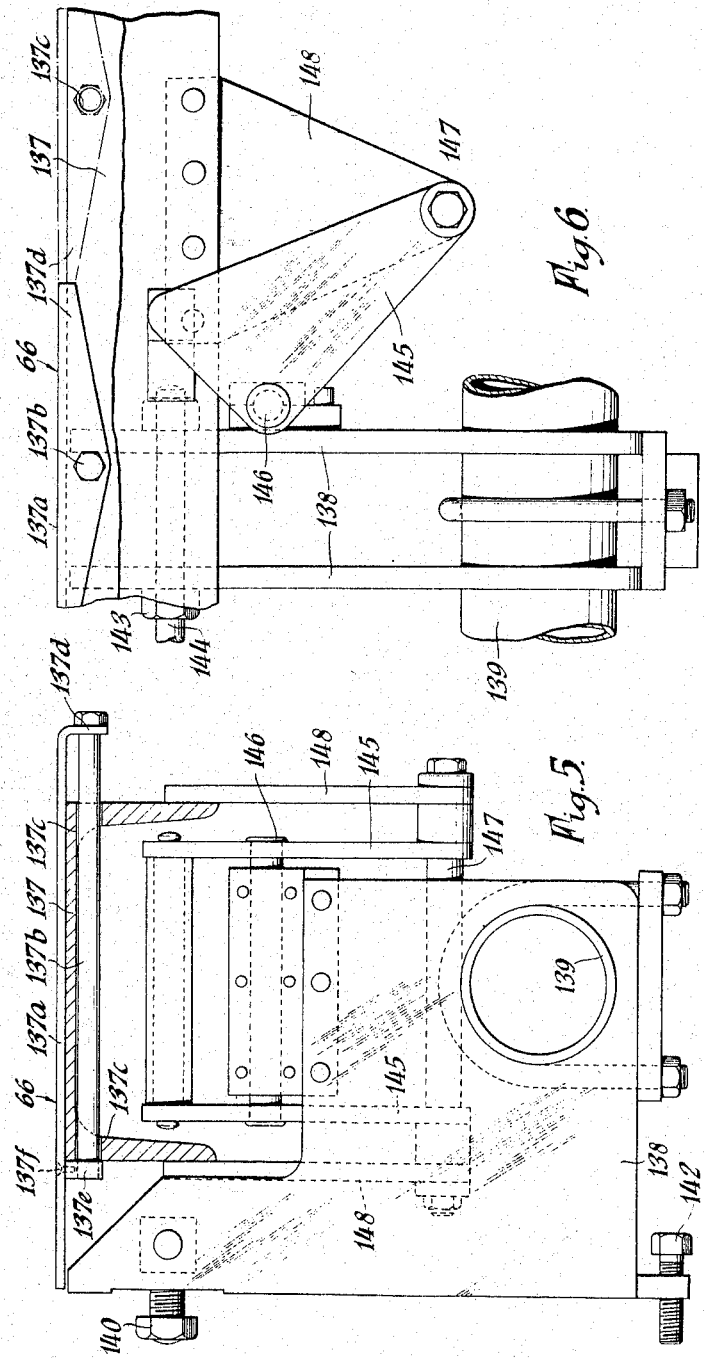
Inventor
William James Brown
By Stevens, Davis, Miller & Mosher
Attorneys

United States Patent Office 3,276,557
Patented Oct. 4, 1966

3,276,557
MACHINE GUARDS
William James Brown, 34 Woodfield Road, Northgate, Crawley, Sussex, England
Filed Aug. 31, 1964, Ser. No. 393,216
14 Claims. (Cl. 192—134)

This invention relates to guards for protecting the operators of machines, the tool of which is caused to approach the work which is fed by an operator to the feed space of the machine and is concerned with that type of guard in which the movement of the guard to its operative position in which it guards the feed space of the machine effects the operation of electrical switch mechanism to set the machine into action.

The invention has for its object to provide various improvements in machine guards of this type which together result in increasing the efficiency of operation thereof.

The specification of British Patent No. 717,031 discloses a machine tool guard comprising operator controlled power means to move the guard to closing position across the work feed space of the machine in advance of the operation of the tool of the machine, and electrical control means which operate to render the tool active only when the guard reaches closing position but to cause the power operating means to return the guard to its open position if its movement to closing position is arrested by obstruction in the work feed space.

According to the prior construction the guard may comprise one or more switch operating detector components which are movably carried by the guard proper, the component or each component being moved in switch operating movement on the guard either by the presence of an obstruction in the feed space or by the arrival of the guard at its closing position; the operation of the component or any one component in the former case causes the power means to return the guard to open position while in the latter case the simultaneous operation of the components by closure of the guard effects conjointly with a limit switch the operation of the tool. Such a guard will hereinafter in the description and claims be called a guard of the kind referred to.

According to the invention a guard of the kind referred to has a number of detector components, each detector component being provided with a change over switch, the switches being connected in parallel and controlling the circuits of a tool operation control relay and an overriding relay, the switches being so arranged that in normal operation of the tool, the guard descends operating all switches simultaneously to open the overriding relay and close the tool operation control relay, but where obstruction occurs, changeover of only some of the switches is caused by the obstruction and maintains the overriding relay closed and thus prevents operation of the tool control relay.

The invention also provides means for raising and lowering a guard for a machine tool, press or like apparatus which comprises a fluid pressure operated cylinder, the piston of which is connected directly or indirectly to the guard whereby pressurized fluid, on one side of the piston maintains the guard in its raised or open position and pressurized fluid, is fed to the other side of the piston to equalize the pressure on both sides of the piston and allow closure of the guard. For example a hydro-pneumatically operated cylinder can be used in which oil or other hydraulic liquid is supplied to one side of the piston and air or other gas is fed to the other side thereof.

According to a further feature of the invention a work supporting table for use in a machine tool, press or like apparatus is provided which comprises a table top mounted on a parallel linkage operable by a screw and nut mechanism so that the top can be raised or lowered with a parallel motion.

The invention will now be described in more detail by way of example with reference to the accompanying drawings in which:

FIGURE 3 is a circuit diagram of the circuits used to operate the mechanism shown in FIGURE 2;

FIGURE 4 is an elevational view of a work supporting table for use in conjunction with the guard shown in FIGURES 1 and 2; and FIGURES 5 and 6 are front and side elevational views of part of the work supporting table shown in FIGURE 4 showing the operation thereof.

Figure 1:
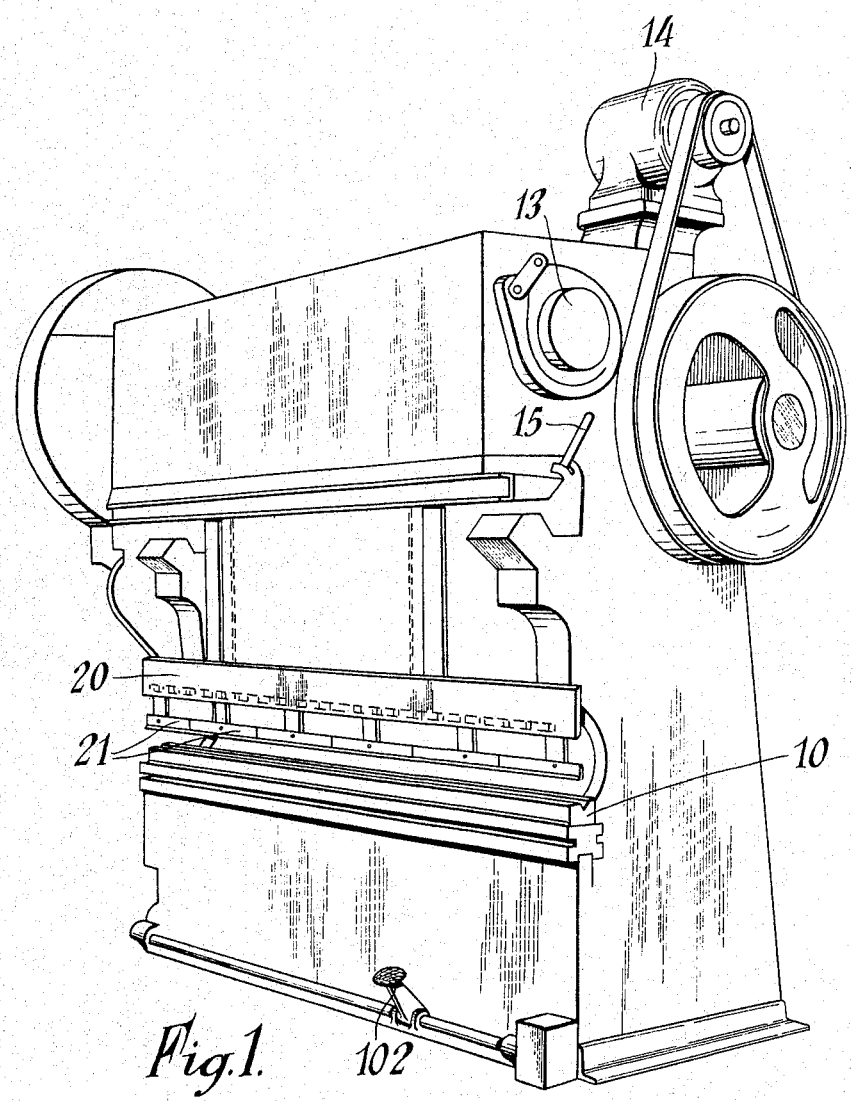
FIGURE 1 is a front perspective view of the machine tool shown in patent specification No. 717,031 to which the present invention is applied.

The machine shown in FIGURE 1 is a conventional sheet metal bending or folding press having a horizontal V-recessed bed 10 on which the sheets are supported and a vertical folding blade 11 (see FIGURE 2) which is movable downwardly within a guide 12 towards the bed 10 in register with the recess therein. The folding blade is operated by a crank shaft 13 driven by an electric motor 14 through a clutch controlled by a clutch lever 15.

Figure 2:
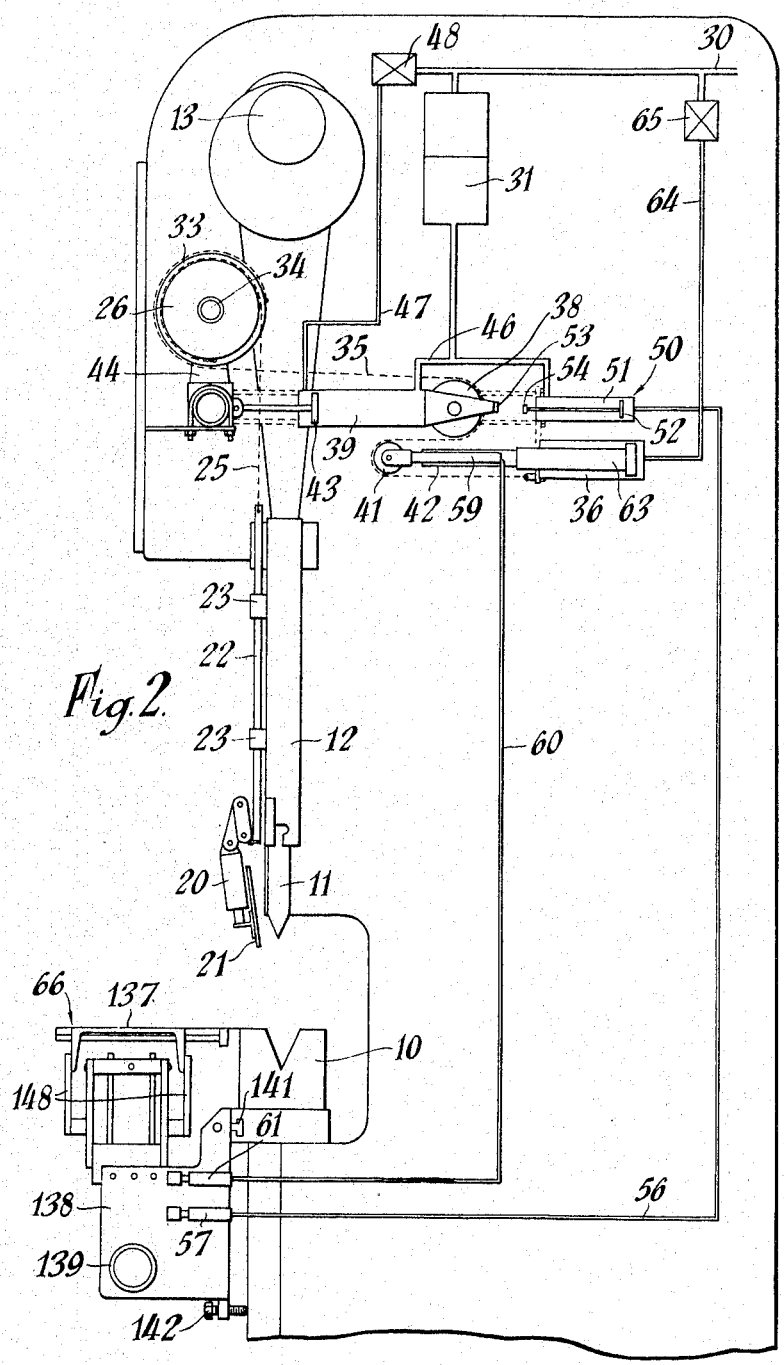
FIGURE 2 is a diagrammatic and elevational view showing the application of the present invention to the machine shown in FIGURE 1.

Mounted in front of the folding blade 11 is a guard beam 20 which extends along the length of the blade and carries a number of depending gates 21 constituting obstruction detectors. The beam is suspended by links 22 which slide vertically in guides 23 and are operated by a chain 25 attached to a pair of chain wheels one of which is shown at 26 (FIGURE 2).

Anti-clockwise rotation of the chain wheels 26 raises the guard and clockwise rotation of the chain wheels allows the guard to fall under the action of gravity.

The operating mechanism of the guard will now be described with reference to FIGURE 2.

The mechanism is operated by means of compressed air and oil pressure devices and for this purpose an air pressure supply pipe is provided at 30 and a pressurized oil reservoir is provided at 31.

Rotation of the chain wheels 26 is achieved by means of a second chain wheel 33 which is attached for rotation with a shaft 34 to which is also secured chain wheels 26. Chain wheel 33 is rotated by means of a second chain 35 attached at one end to the wheel 33 and at the other end to a high lift cylinder 36 the purpose of which will be hereinafter described. The chain 35 passes around two intermediate chain wheels, one wheel 38 being mounted on the operating cylinder 39 and the other wheel 41 being mounted on the guard beam closure adjustment mechanism 42. The piston 43 of the operating cylinder 39 is rigidly attached to a bracket 44 in which the shaft 34 rotates, the cylinder 39 being movable with respect to the piston 43 during raising and lowering of the guard. Oil is supplied to the right hand side of the cylinder by a flexible pipe 46 from the reservoir 31 and air pressure is supplied to the left hand side of the cylinder by a flexible pipe 47 the air supply being controlled by an electrically operated valve 48.

The guard is shown in FIGURE 2 in the raised position and in this position the cylinder 39 is at its right most position, retained in this position by the oil pressure.

To lower the guard, the valve 48 is actuated and compressed air is fed to the left hand side of the cylinder 39 and equalizes the pressure in the cylinder. In this condition, the weight of the guard will tend to turn the wheel 26 clockwise thus turning the wheel 33 clockwise and pulling the wheel 38 to the left. Since the pressures in the cylinder 39 are equalized the cylinder 39 will move to the left under this force and will allow the guard to fall.

To raise the guard from its lowered position, the valve 48 is deenergized and this shuts off the compressed air supply to the cylinder 39 and opens the left hand side of the cylinder to the atmosphere. Thus the oil pressure acts to move the cylinder 39 to the right and it thus again takes up its position shown in FIGURE 2. This motion of the cylinder 39 pulls the chain 35 from the wheel 33 and rotates it anti-clockwise also rotating wheel 26 anti-clockwise and raising the guard.

Motion of the cylinder 39 to the right is restricted by a stroke limiting device 50. This device consists of a cylinder 51 and a piston 52, an extended portion 53 of the cylinder 39 abutting against the rod 54 of the piston at the end of its stroke. The position of the abutment formed by the head of the rod 54 is determined by the supply of oil to the cylinder 51 through a pipe 56, this supply of oil being controlled by a screw arrangement 57 controlled in turn by the machine operator. The variability of this abutment enables the raised height of the guard to be adjusted for the tool in use.

Adjustment of the lower position of the guard is controlled by means of a piston and cylinder arrangement 42, to the piston 59 of which is attached the chain wheel 41. The horizontal position of this chain wheel 41 is thus determined by oil fed to the cylinder by a pipe 60 controlled by a manually operated screw arrangement 61. By means of this horizontal movement of the wheel 41 the guard can be raised or lowered independently of the operating cylinder 39 and thus adjustment of the guard closed position can be obtained. To permit this adjustment to be made the guard beam is first moved to its lowest position and to permit this the air valve 48 is operated by actuation of a switch hereinafter described to allow the cylinder 39 to move to its extreme left hand position.

In order to enable the press tool to be changed it is necessary to raise the guard above the tool attachment means and for this purpose the high lift cylinder 36 is provided. The cylinder is provided with a piston 63 to which the guard beam closure adjustment mechanism is attached. Operation of the high lift device is by air pressure supplied by pipe 64 and controlled by valve 65. Actuation of this valve 65 supplies air pressure to the cylinder 36 forcing the piston 63 to the left and hence also the wheel 41 thus giving extra lift to the guard beam when required.

Also shown in this figure is an adjustable work supporting table 66 which is particularly suitable for use with the guard beam mechanism and this table will be hereinafter described with reference to FIGURES 4 to 6 of the drawings.

The electrical controlling circuit which controls the operation of the tool will now be described with reference to FIGURE 3.

With the electrical system switched off, the guard and tool remain in their upper position.

To operate the tool mechanism, the double pole isolating switch 101 is first closed. Initial pressure on a foot switch 102 results in closure of a switch 102a so that electrical energy is supplied to the latch relay 103 through lines 104 and 105 and through the gate switches 107 of the guard which are made to contacts 108 as shown. Operation of the latch relay 103 connects the line 104 to the coil 109 of the valve 48 which operates the guard cylinder 39. Thus the valve 48 opens and the guard descends.

Assuming a normal operation with no obstructions, the gates 21 contact the table and operate the gate switches 107 so that they make with contacts 110. The bottom limit switch 111 is also operated simultaneously by the guard cylinder 39 when at maximum left position. Thus the latch-relay 103 is deenergized and current is fed to the impedance timer or other timing device 113 and through this to a holding relay 114. The impedance timer or other timing device 113 is put in the circuit to give a small time lapse so as to ensure that the latch relay 103 is deenergized before operation of the holding relay 114.

On operation of the holding relay 114, current is fed by way of contacts 110 to the clutch relay 115 which closes and maintains the coil 109 energized and the guard closed. If now the foot pedal 102 is further depressed the foot switch 116 is operated, the coil 117 controlling clutch operation is energized and the tool descends starting the work cycle.

If however there is an obstruction in the feed space when the guard descends the gates 21 meeting the obstruction will close their associated switches before the switches associated with the non-obstructed gates. Thus the holding relay 114 will close before the latch relay 103 opens. Thus the connection to the coil 109 is opened and the guard is returned to its upper position. Before the guard can again be lowered, the switch 102a associated with the foot pedal 102 must be opened.

When the obstruction has been removed and the guard again lowered, the clutch operating relay 115 will be energized to start the work cycle.

A manually operable switch 149 is provided the operation of which results in actuation of valve 48 to admit compressed air into cylinder 39 so that the same moves to its extreme left hand position for the purpose already referred to.

In certain operations it is desirable for the guard to clear the work before folding of the blank takes place and for this purpose mechanically operated switches are provided operated by a plunger associated with the tool so as to follow the movements thereof.

With the tool in the raised position, the top limit switch 121 is open but as soon as the tool passes top dead center, the top limit switch closes. At a point during downward motion of the tool just prior to the folding action, the plunger operates a guard return switch 122 which energizes a back stroke relay 124 which in turn operates a top lock relay 125. This relay 125 breaks the connection to the coil and returns the guard to its raised position. At the same time the clutch relay 115 is maintained energized so that the raising of the guard does not affect the operation of the tool. When the tool has passed the bottom of its stroke a drag operated switch 126 closes and the tool returns automatically to its raised position. Where mechanical braking is used, cut off of the driving mechanism is performed by the top limit switch 121 to ensure top dead center stopping of the tool. Preferably the timed operation of switch 122 by the plunger can be varied to allow for variations in the depth of tooling.

The circuit also includes a press button switch 127 the operation of which is utilized to adjust the vertical position of the press beam to any desired predetermined position. The switch 127 is a double pole press button switch and when the button is operated switch contact 128 is connected through switch 122 and contact 128a to the back stroke relay 124 which thus closes its contacts 129 so that the clutch operating coil 117 is energized. A toggle switch (not shown) can be connected in parallel with the push button switch 127, the operation of which to one switching position overrides the circuit of top limit switch 121 thus permitting the tool to move to the predetermined position determined by switch 122. This initiates press cycle operation without operation of the guard cycle. The press cycle proceeds until the guard return switch changes over. From this point the press operation can be initiated at will by the further depression of foot pedal 102 to operate foot switch 116. If foot pedal 102 was operated during this part of the cycle the top lock relay 125 locks out the press cycle when the guard limit switch operates so that foot pedal 102 must be released before the cycle can be initiated.

The circuit shown in FIGURE 3 also includes means selectively operable at will by the operator to prevent the raising of the guard until the press tool has stopped rotating after a working stroke. For this purpose a small output alternating current generator 130 is provided which is driven by a suitable driving connection from the press drive. The output of the generator 130 is connected to a relay 131 when contacts 132 and 133 associated with the return stroke relay 129 close. Contacts 134 associated with the relay 131 close to energize the guard cylinder coil 109 which permits the guard beam to lower to close the work feed space. Connections 135 provide a closed circuit to hold the relay 131 energized to ensure that guard beam remains down. A manually operable switch 136 is provided in the output circuit of the generator which permits this generator circuit to be connected or cut out as desired.

FIGURES 4, 5 and 6 of the accompanying drawings show a press work supporting table the height of which is adjustable to compensate for variation in the height of the press tooling so that a continuous level surface is provided engageable by the switch-operating detector components of the guard when the same is in the lowered position. The press table comprises a table-top consisting of a channel section beam 137 disposed in an inverted position the base of the channel providing a surface for the support of a plurality of plates 137a arranged side by side. Each plate 137a is secured to a bolt 137b each of which is slidably supported in oppositely disposed pairs of holes 137c suitably spaced along the flanges of the beam 137. The shank of each bolt passes through a hole in a downturned flange 137d at the front end of each plate, each plate being secured to the appropriate bolt by a screw 137f which screws into a nut 137e on the bolt. The plates 137a are thus independently slidable so that the configuration of the table top can be altered. The table top is mounted on a parallel linkage operable by a screw and nut mechanism to raise or lower the table top with a parallel motion. The work table is locatable at the front of the press so that the table top extends parallel to the press tools the height of the table being adjusted so that the table top extends in the plane of the upper surface of the stationary press tool supported on the press anvil. Means are also provided for permitting adjustment of the table in relation to the press to permit levelling.

In the particular construction shown the work table is carried by support means consisting of mounting brackets shown generally at 138 interconnected by a tubular tie member 139. The support means so formed is adapted for attachment to the press so as to extend along the front thereof, by engagement of nuts 140 in T-slots 141 in the press front, the support means being angularly adjustable in relation to the press to permit the work table to be levelled, by adjusting bolts 142.

Vertical adjustment of the work table top 137 is effected by a screw and nut mechanism shown generally at 143 the screw of which, constituted by a threaded rod 144, is operatively associated with pairs of bell crank levers 145 mounted so as to be pivotal to effect the vertical movement of the work table top with a parallel motion. As shown each pair of bell crank levers 145 is mounted on a pivotal mounting 146 secured to the mounting brackets, and also connected by pivotal connections 147 to side plates 148 depending downwardly from the work table top.

The present invention thus provides means whereby maximum safety is given to a press operator, the control means providing a foolproof interconnection between the press drive and the guard operating means which cannot readily be tampered with.

I claim:
1. A machine tool guard having a plurality of detector components, each detector component being provided with a changeover switch, said switches being connected in parallel to control energization of tool-actuating means, said actuating means including a latching relay and a holding relay, in normal operation of said tool said switches being actuated by the descent of the guard to its full downward position to act simultaneously to deenergize the latching relay and energize the holding relay, and under abnormal conditions, when the complete descent of said guard is prevented, actuation of only some of said switches causing said holding relay to energize thus preventing the actuation of the tool.

2. A guard according to claim 1 in combination with means for controlling the operations of the guard and the tool to which the guard is fitted.

3. A guard according to claim 2, wherein the said control means includes operator actuated switch means for controlling the initiation of the operation of raising and lowering the guard and operation of said machine tool to which the guard is fitted, such operator actuated switch means being arranged to be operable to initiate the guard and tool operations in sequence one after the other.

4. A guard according to claim 3, wherein said operator actuated switch means comprises two switches operable one after the other by actuation of operator actuated means common to both switches.

5. A guard according to claim 4, wherein initial movement of said operator actuated means initiates actuation of guard operating means to permit downward movement of the guard, further operation of said operator actuated means resulting in operation of said other switch to initiate operation of the machine tool.

6. A guard according to claim 5, wherein the control means includes time delay means for ensuring operation of the guard operating means before operation of the tool operating means.

7. A guard according to claim 6, wherein initial operation of the operator actuated means results in operation of fluid pressure operated means effecting the guard movement.

8. A guard according to claim 7, wherein means are provided for regulating the speed of guard movement.

9. A guard according to claim 8, wherein means are provided for permitting adjustment of the stroke of the tool.

10. A guard according to claim 9, wherein means are provided to hold the guard in the closed position during unwanted press running.

11. A guard according to claim 10, wherein the control means includes a small output alternating current generator driven from the press drive, the generator output being connectable to relay controlling operation of the guard cylinder operating circuit.

12. A machine tool press guard comprising a guard beam, means for supporting said beam in a raised position, means for actuating said beam supporting means to permit said guard beam to move downwardly by gravity, a plurality of detector plates on said guard beam, a switch associated with each said detector plate, power operated means for raising and lowering the tool including a clutch, said detector plate switches being connected in parallel in a circuit for controlling the power means in driving the tool downwards, said circuit further including operator actuated switches operable in sequence, a latching relay and a holding relay, said guard in descending to its full downward position, under normal conditions actuating all switches to open the latching relay, under the abnormal conditions, when the fall of the guard is prevented, actuation of only some of said switches being caused by the failure of the guard to fully descend maintaining the holding relay energized thus preventing the descent of the tool.

13. A machine tool as claimed in claim 12 having a work supporting table comprising a table top mounted on a parallel linkage operable by a screw and nut mechanism so that the table top can be raised and lowered with a parallel motion.

14. A machine tool according to claim 13, wherein the table top comprises a channel section beam disposed in an inverted position, the outer surface of the channel base providing a surface supporting a plurality of plates arranged side by side, each said plate being secured to means permitting the independent sliding movement of each said plate in the transverse direction of the beam.

References Cited by the Examiner
UNITED STATES PATENTS
3,129,799  4/1964  Dean et al. _____ 192—129
FOREIGN PATENTS
717,031  10/1954  Great Britain.

DAVID J. WILLIAMOWSKY, *Primary Examiner.*
A. T. McKEON, *Assistant Examiner.*